S. J. JENNINGS.
SLEIGH RUNNER FOR VEHICLES.
APPLICATION FILED JULY 12, 1907.
898,743.
Patented Sept. 15, 1908.
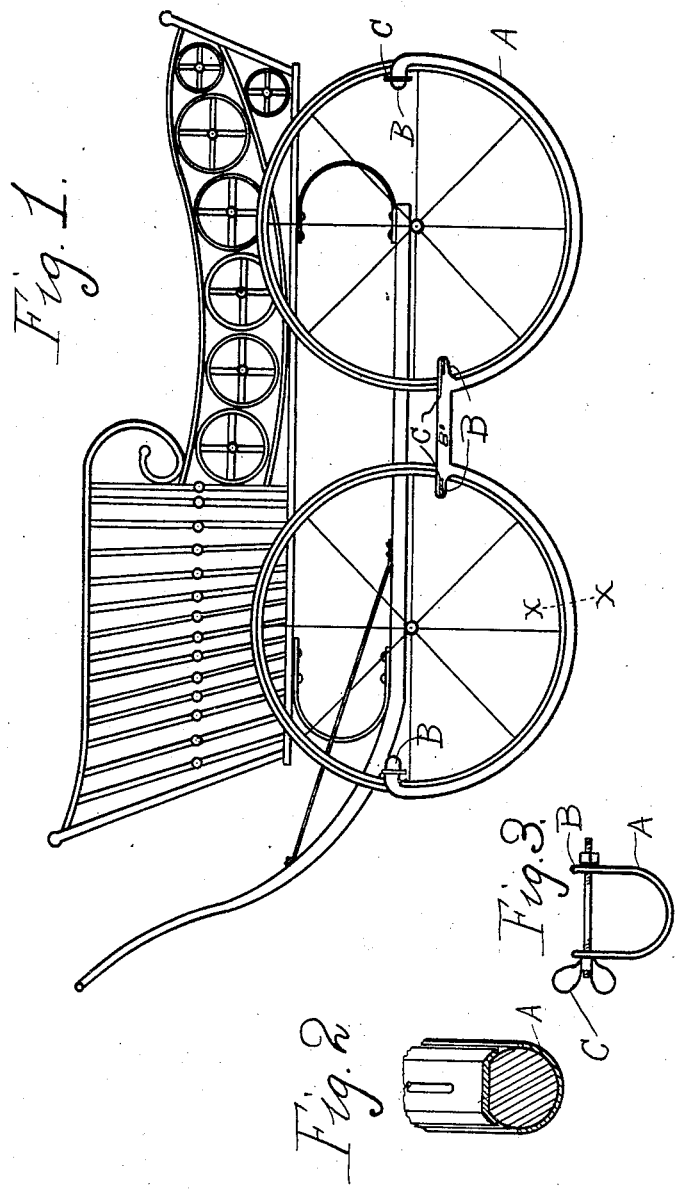
WITNESSES
S. M. Gallagher
J. J. Williamson
INVENTOR
Sadie J. Jennings
BY
W. Preston Williamson, ATTORNEY

UNITED STATES PATENT OFFICE.

SADIE J. JENNINGS, OF TREMONT, NEW YORK.

SLEIGH-RUNNER FOR VEHICLES.

No. 898,743.      Specification of Letters Patent.      Patented Sept. 15, 1908.

Application filed July 12, 1907. Serial No. 383,372.

*To all whom it may concern:*

Be it known that I, SADIE J. JENNINGS, a citizen of the United States, residing at Tremont, county of New York, and State of New York, have invented a certain new and useful Improvement in Sleigh-Runners for Vehicles, of which the following is a specification.

My invention relates to a new and useful improvement in sleigh runners for vehicles, and has for its object to provide a simple and effective device which may be attached to the wheels of any kind of vehicle, thus converting the same into a sleigh.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of a baby coach showing my improved runners applied thereto. Fig. 2, an enlarged section at the line x—x of Fig. 1 illustrating the cross section of the runner. Fig. 3, a view of one of the ends of the runner showing the construction of the clamp for securing the runner to the wheels.

In carrying out my invention as here embodied, A represents a runner which is made from a strip of metal, U-shape in cross section and so bent as to permit the two wheels on each side of a vehicle to set therein, and each of these runners have formed integral therewith the clamp lugs B, adapted to embrace the rim of the wheel, and C are thumb screws threaded through these lugs so as to clamp them firmly in place, it being understood that such a runner is applied to each set of wheels.

Each of the runners is of substantial semi-circular form having their inner and outer ends turned inwardly to form the aforesaid clamp lugs B. The inner ends of the runners are rigidly united by a single horizontal connecting member B'.

Each runner may be said to consist of two runner members and a horizontal connecting member the latter having its ends extended beyond the points of juncture between B' and A to form clamp lugs B. The outer free ends of each runner member A, extends upwardly to points above the horizontal connecting member B', which enables the rigid and positive securement of the runners to the wheels. Member B', by reason of its straight horizontal disposition forms a rigid brace which lies between and connects the vehicle wheels at points adjacent their centers.

While I have here shown my invention as applied to a baby coach, it is obvious that it may be used upon the wheels of any vehicle, and when clamped thereon will convert the vehicle into a sleigh, and when not needed for such purposes may be removed and suspended from the body or running gear of the vehicle.

Having thus fully described my invention, what I claim as new and useful, is—

In combination with the wheels of a vehicle, sleigh runners therefor each composed of two runner members of arc-like form, a horizontal connecting member rigidly secured to the inner ends of said runner members and having its end extremities projecting beyond said inner ends of said runner members to form clamp lugs, the outer ends of said runner members extending up and above said horizontal connecting member and being turned inwardly to form clamp lugs, a thumb screw for each pair of lugs, said horizontal connecting member serving as a brace which extends in the space between said wheels at points adjacent to their centers.

In testimony whereof, I have hereunto affixed my signature in the presence of two subscribing witnesses.

SADIE J. JENNINGS.

Witnesses:
 FLORENCE WILKINSON,
 EVA B. FLEMING.